(12) United States Patent
Rönneke et al.

(10) Patent No.: US 7,542,447 B2
(45) Date of Patent: Jun. 2, 2009

(54) POOL OF FUNCTIONAL SERVER NODES IN A PACKET DATA NETWORK AND METHOD OF TRANSFERRING A MOBILE TERMINAL BETWEEN THE SERVER NODES IN THE POOL

(75) Inventors: Hans B. Rönneke, Kungsbacka (SE); Niklas Lundin, Göteborg (SE); Anders Henriksson, Göteborg (SE); Sten Pettersson, Torslanda (SE); Anders Åhlén, Göteborg (SE); Staffan Bonnier, Askim (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 541 days.

(21) Appl. No.: 10/546,492

(22) PCT Filed: Mar. 20, 2003

(86) PCT No.: PCT/EP03/02944

§ 371 (c)(1),
(2), (4) Date: Aug. 22, 2005

(87) PCT Pub. No.: WO2004/084572

PCT Pub. Date: Sep. 30, 2004

(65) Prior Publication Data

US 2006/0193289 A1 Aug. 31, 2006

(51) Int. Cl.
*H04W 4/00* (2009.01)
(52) U.S. Cl. .................. 370/331; 455/436; 455/453

(58) Field of Classification Search .............. 455/349, 455/453, 561, 560
See application file for complete search history.

(56) References Cited

U.S. PATENT DOCUMENTS 6,195,705 B1 * 2/2001 Leung .................. 709/245
2002/0172207 A1 * 11/2002 Saito et al. ............... 370/400

FOREIGN PATENT DOCUMENTS

| EP | 1 280 365 A1 | 1/2003 |
|----|--------------|--------|
| WO | WO 02/32062 A1 | 4/2002 |
| WO | WO 03/001830 A1 | 1/2003 |
| WO | WO 03/017704 A1 | 2/2003 |
| WO | WO 03/019958 A1 | 3/2003 |

OTHER PUBLICATIONS

3GPP Standard TS 23.236 May 2002.*

* cited by examiner

*Primary Examiner*—Nick Corsaro
*Assistant Examiner*—Vladimir Magloire

(57) ABSTRACT

A pool of functional server nodes in a packet data network, and method of transferring a given mobile terminal from a current functional server node to a target functional server node in the pool. An interface enables each functional server node to control any, or a number of, radio network control nodes. When a transfer is desired, the pool selects the target functional server node and initiates a transfer of control responsibility for the given mobile terminal's connections from the current functional server node to the selected target functional server node. The control responsibility is then transferred to the selected target functional server node without interrupting service to the given mobile terminal.

22 Claims, 10 Drawing Sheets

US 7,542,447 B2

POOL OF FUNCTIONAL SERVER NODES IN A PACKET DATA NETWORK AND METHOD OF TRANSFERRING A MOBILE TERMINAL BETWEEN THE SERVER NODES IN THE POOL

FIELD OF THE INVENTION

The present invention relates to an arrangement comprising a packet data support node, comprising a functional server node forming part of a conglomerate, or a pool, of functional server nodes in common controlling a number of radio networks or radio network control means, to which mobile terminal stations are connected. The invention also relates to a method for transferring mobile terminal stations between functional server nodes.

STATE OF THE ART

In communication systems supporting communication of packet data including a number of radio networks and core networks, e.g. a PLMN, each radio network generally comprises radio network control means, comprising one or more radio network control nodes controlling a number of base stations, to which user stations can be connected or attached. Generally a radio network control means, or a radio network control node, is controlled by a packet data support node of the core network. For GPRS/UMTS such a packet data support node is denoted an SGSN (Serving GPRS Support Node). Another support node in such a communication system is the GGSN (Gateway GPRS Support Node) which handles or controls communication with external packet data networks. In systems known today SGSN, or more generally the packet data support node, controls one or more radio network control means, i.e. it is responsible for such radio network control means, for example RNCs. It is fixed which SGSN controls which RNC(s).

It has been suggested in one document referred to below to split up a packet data support node, or particularly an SGSN, in two "sub-nodes", namely an SGSN server and another sub-node denoted media gateway (MGW) wherein the SGSN server node handles control plane functionalities and the media gateway handles user plane functionalities. However, redundancy issues constitutes a problem in such a system, as in other pooled system, since if an SGSN is malfunctioning, packet communication will fail unless another SGSN can be allocated or a redundant SGSN can be provided for. Generally, as a subscriber performs an attach procedure to the network, the RNC controlling the base station it connects to, passes the attach request to the SGSN it is connected to, i.e. which SGSN that is used is generally speaking based on the location of the subscriber.

This gives rise to problems also as far as load sharing is concerned, which generally is not handled in any satisfactory manner. As an example, at rush hours a large number of subscribers move in the same direction, i.e. towards the center of a town and, since the selection of SGSN is location dependent, i.e. it depends on which radio network the subscriber has attached to, the SGSNs in such areas run the risk of being overloaded, whereas other SGSNs hardly are used at all. At a later time the situation may be the opposite, i.e. the previously hardly loaded SGSNs will be heavily loaded whereas the others will have a lot of spare capacity. This means that the SGSNs have to be dimensioned for the "worst case". Moreover, as a subscriber is roaming within the network such that the closest base station will be controlled by another radio network control means than the one he attached to, and hence the SGSN which is responsible for a particular radio network control means is statically configured, the responsibility for the connection will be taken over by another SGSN etc. This involves a lot of signalling e.g. with the home location node (HLR) of the subscriber, i.e. it requires HLR updates, which means a load on the HLR and it involves a lot of signalling. To make reconfigurations and to add equipment in such a system will also involve high costs and much complicated configurational work. Still further high costs are involved when such a system needs to be built out, i.e. when new nodes or nodes with a greater capacity, or nodes replacing malfunctioning servers, need to be added. Such solutions are disadvantageous as far as load sharing is concerned, and packet data support node redundancy is not provided for to a sufficient extent, network configuration work gets expensive, time consuming and complicated. In addition thereto packet data support nodes are associated with specific radio network control means which means that, for a roaming subscriber, the responsibility for such subscriber by a packet data support node will be transferred to other packet data support nodes as the subscriber moves throughout the network. This leads to a lot of signalling between packet data support nodes and home location nodes of the subscriber in order to update involved nodes (HLR-nodes, SGSN-SGSN, SGSN-GGSN) which puts a high load on e.g. the home location node and requires a lot of signalling in general. This problem gets even more serious if, at a given time, a plurality of subscribers moves substantially along the same path, cf. rush hour traffic. Therefore a solution has been suggested in the Swedish Patent Application No. 0003719-2, filed on Oct. 13, 2000, and the content of which herewith is incorporated herein by reference.

This document shows a communication system in which at least some of the packet data support nodes are divided into a functional server node (FSN) and a functional user gateway node (UGN) Alternatively the functional server node functionality, i.e. the control plane functionalities, of a number of packet data support nodes, i.e. functional server nodes, are provided in a pool; no functional user gateway nodes being provided. A number of functional server nodes are provided to, in common, control at least a number of routing areas served by different radio network control means. These functional server nodes are arranged to form a pool of functional server nodes and each of the functional server nodes in a said pool is able to control any of the radio network control means.

The document also suggests a packet data support node for mobility and session management in a communication system supporting communication of packet data. The packet data support node is divided into a functional server node and a user gateway node, or comprises at least a (separate) functional server node. The functional server node forms part of a pool of functional server nodes and, in common with said other functional server nodes, it is able to serve at least a given part of the communication system, i.e. at least a number of routing areas or a number of radio networks, particularly radio network control means controlling a number of different radio networks. This means that said functional server node is responsible for all radio network control means within the given part of the network.

However, when several core network nodes support the same Radio Access Network (RAN), known as pooling of nodes as discussed above, a mechanism is needed to transfer terminals from one node to another. This is applicable when a node needs to be taken down for service. It is also applicable when a node is introduced (either new or restarted) into the pool and terminals should be transferred to it to more quickly balance the load within the pool. Otherwise it may take a very long time before the pool gets balanced again, due to the fact that terminals remember their P-TMSI (Packet Temporary Mobile Subscriber Id) at power off. They always return to their previous SGSN at power on, even if a new, less loaded SGSN has been added to the pool (on the assumption that the terminal is still within a routing area covered by the pool).

In known solutions, in a pooled environment, terminals are distributed among the pooled core nodes by the RAN. This is done when a terminal either powers on or is asked by the network to re-connect. There exists no mechanism to transfer a terminal to another node without breaking the connection of the terminal and therefore the user service.

To move a terminal from a node, the mechanism of today requires that the terminal moves out from the pool and back again. Since the idea with pool is to keep terminals as long as possible within the pool, there is normally a small function of terminals doing this. No other mechanisms than this "natural" one exists today to redistribute and balance the load. Since this is the only way, it will take quite some time, especially for new/restarted nodes, to take an equal share of the terminal load in the pool. For making a pool of nodes functioning well, a faster mechanism which can be controlled by the network operator would be needed to redistribute terminals between nodes.

The pool concept is described in 3GPP Standard TS 23.236, which herewith is incorporated herein by reference.

SUMMARY OF THE INVENTION

What is needed is therefore a mechanism, and an arrangement, (a node) through/by which terminals (also called mobile terminal stations, or mobile stations) can be transferred to other nodes within the conglomerate or pool of nodes without affecting the connection for the end user terminal. Particularly an arrangement (node) is needed which is able to transfer terminals to other nodes, e.g. when the node needs to be taken down for service or similar. A solution is also needed through which terminals can be transferred to a newly introduced node in the pool; it may relate to a "new" node, or to a restarted node, among others in order to distribute the load between the nodes within the conglomerate/pool. In general a solution is needed through which can be provided for load sharing, balancing the load as desired among the nodes.

A solution is also needed through which terminals can be transferred from a node which is taken down, either for maintenance or because it is malfunctioning, overloaded or running the risk of being overloaded. A solution is also needed through which terminals can be transferred/redistributed in a fast and easy manner, without deteriorating the service offered to the end user.

Still further a solution is needed through which terminals can be transferred to substantially any selected node within the pool/conglomerate, and through which the transfer(s) may be performed in a scheduled manner. Further yet a solution is needed through which terminals can be transferred between nodes with minimized signalling. Particularly a solution is needed through which all terminals can be transferred from a node (to one or more other nodes) when needed and without impact on the end users concerned.

Even more particularly a solution as referred to above is needed which is applicable also for shared networks, if several operators are concerned, e.g. have one or more radio networks in common, while there being different core networks. A method is also needed through which one or more of the above mentioned objects can be achieved.

Particularly a solution is also needed for taking care of redirection/redistribution of mobile terminal having been directed or transferred to the wrong node, e.g. a node for which where the mobile terminal is not a subscriber or where there is no agreement with the subscriber's operator etc.

Therefore an arrangement (a node) and a method respectively having the characterizing features of the respective independent claims are provided.

Preferred, or advantageous, embodiments are given by the subclaims.

Throughout this document the Functional Server Node (FSN) which can be part of a pool or conglomerate arrangement, can be either a packet data support node (SGSN) (with integrated control plane and user plan), or a packet data support node with only control plane (SGSN server), or even a CGSN which supports also GGSN functionalities.

BRIEF DESCRIPTION OF THE DRAWINGS

The invention will in the following be further described, in a non-limiting manner, and with reference to the accompanying drawings, in which.

DETAILED DESCRIPTION OF THE INVENTION

FIGS. 1-4 show examples on communication systems or networks wherein the inventive concept can be implemented and which implement pools or conglomerates respectively of functional server means.

Figure 4A:
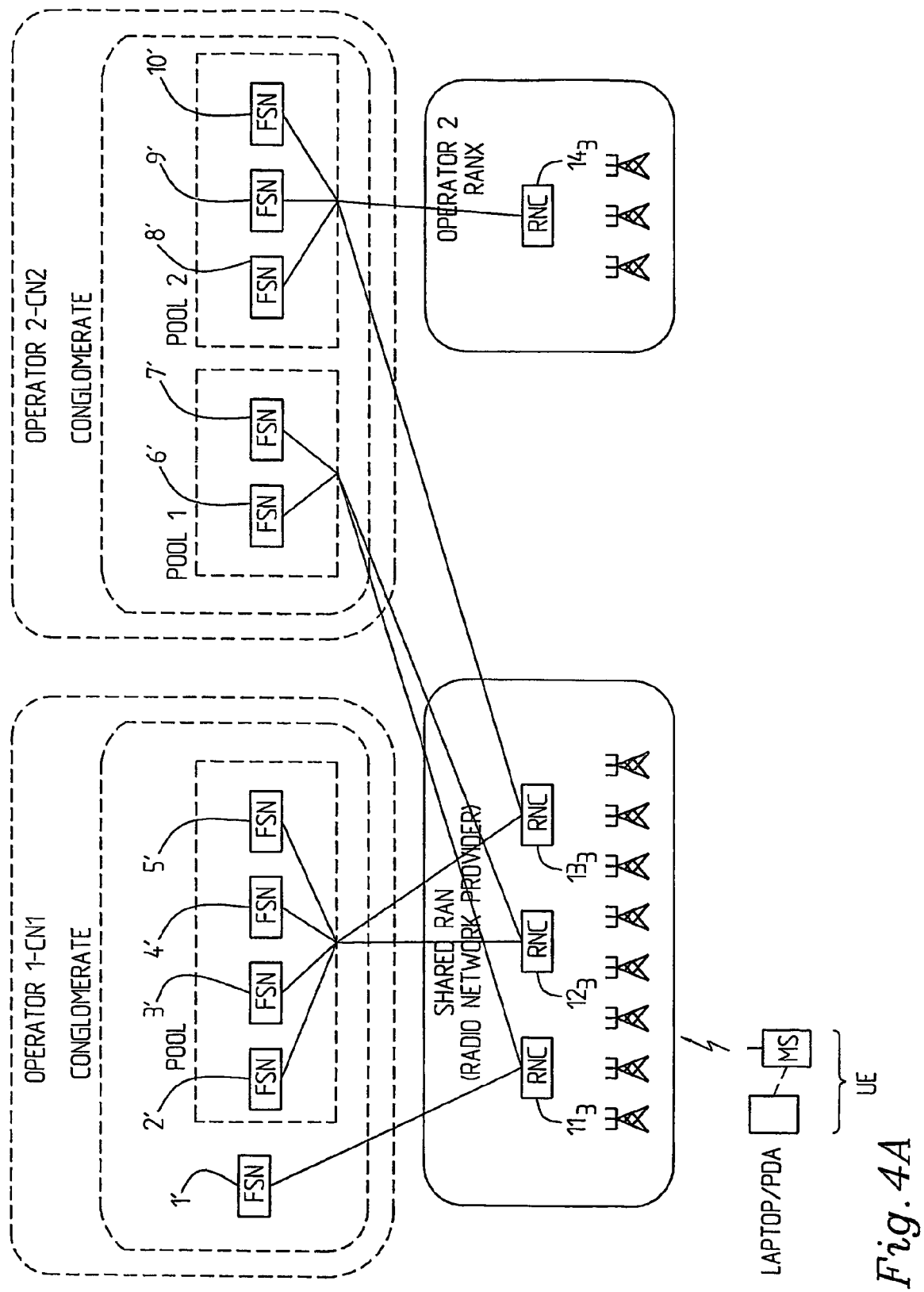
FIG. 4A illustrates a first implementation with shared networks, FSN being either SGSN or SGSN Server or a CGSN.
Figure 4B:
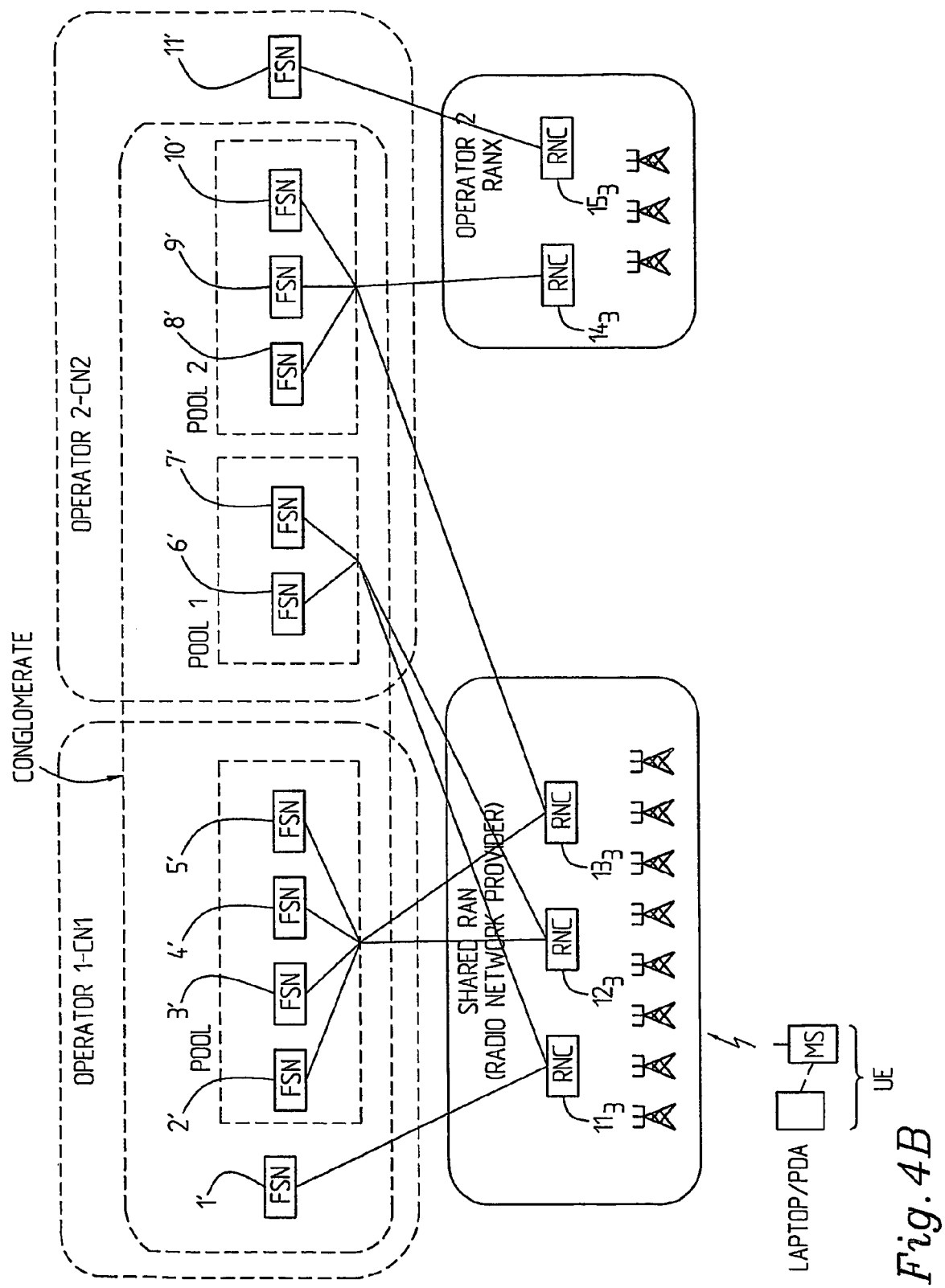
FIG. 4B illustrates a second implementation with shared networks, FSN being either SGSN or SGSN Server or a CGSN.

FIGS. 4A, 4B particularly show examples of environments with shared networks implementing conglomerates, i.e. there are different operators involved as discussed earlier in the application.

Figure 1:
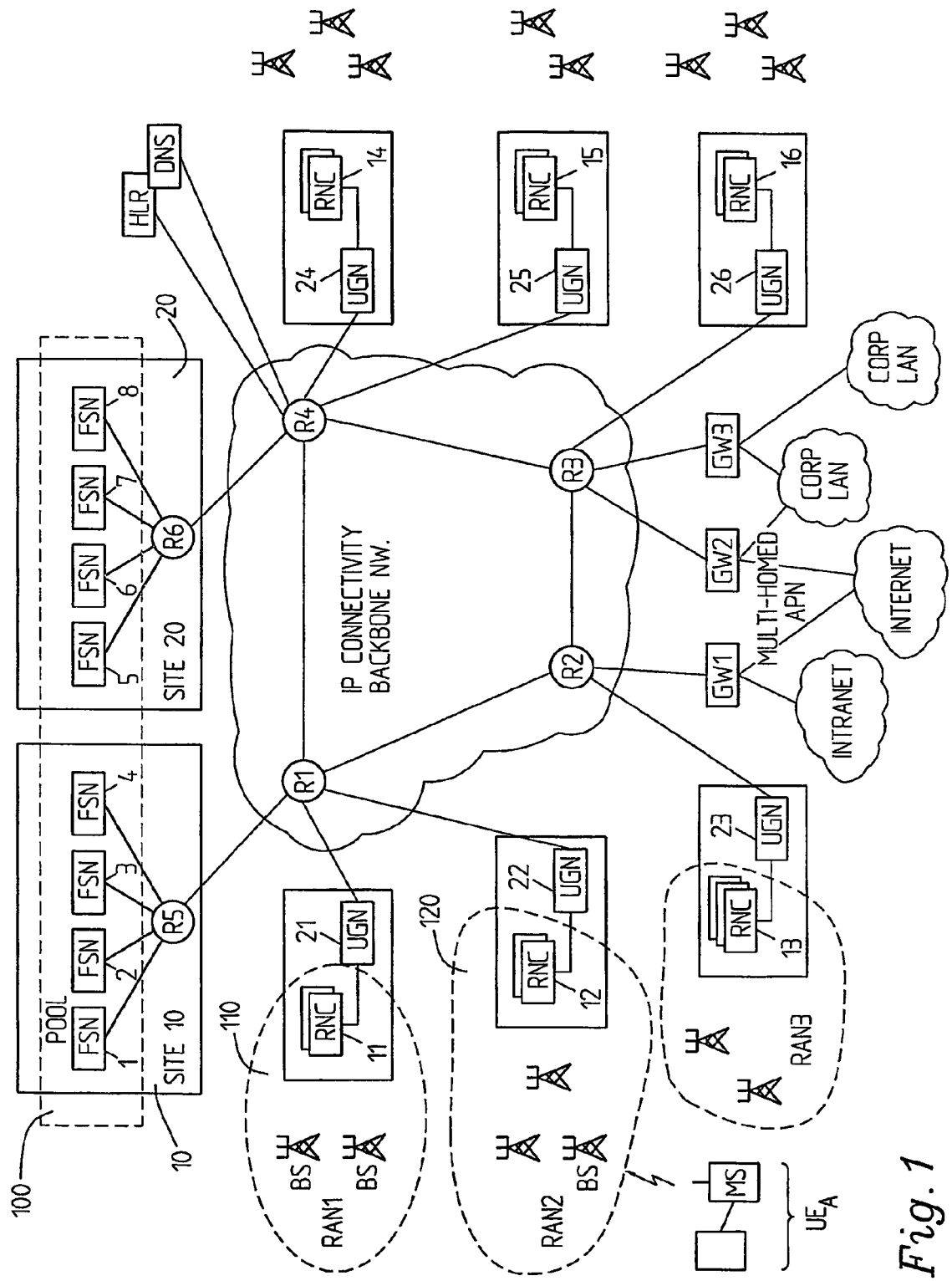
FIG. 1 schematically illustrates a communications system with a pool of functional server means.

More specifically FIG. 1 shows a communication system supporting communication of packet data. It comprises an IP connectivity backbone network and a number of radio networks RAN1, RAN2, . . . , RAN6 (only RAN1-RAN3 explicitly indicated). Each radio network comprises a number of base stations BS which are controlled by radio network control means RNC 11, . . . , RNC 16 respectively. In the figure user equipment station $UE_A$ is illustrated which e.g. comprises a computer connected to a mobile station $MS_A$ which here connects to RAN2. Packet data support node functionality is provided by functional server nodes FSN and user gateway nodes UGN respectively. Thus, a number of decomposed packet data support nodes are provided as FSN 1-FSN 8 and UGN 21-26.

The functional server nodes FSN 1, . . . ,FSN 8 are provided in a pool 100 and they share the responsibility for the control of, here, all the radio networks RAN1, . . . ,RAN6 meaning that any FSN of the pool is able control any of the radio networks. In this embodiment the functional server nodes are provided at two different sites, site 10 and site 20 respectively, for redundancy reasons, which is clearly advantageous for example if one site for one reason or another is destroyed for example due to fire or sabotage. Of course there may be more than two sites and it is of course also possible to keep all the functional server means at a single site. Other alternatives are also possible. In this embodiment FSN 1, . . . ,FSN 4 are provided at site 10 whereas FSN 5, . . . ,FSN 8 are provided at site 20. It should be noted that in this case all the functional server nodes are provided in a common pool. It is also possible to have more than one pool depending for example on geographical and practical considerations. FSN 1, . . . ,FSN 4 are connected to router R5 which in turn is connected to router R1 of the backbone network which is in direct or indirect communication with the other routers of the backbone, here R2,R3,R4. In a similar manner FSN 5, . . . ,FSN 8 are connected to router R6 at site 20 which in turn communicates directly with router R4 of the backbone network. The routers on the links of the backbone network as well as routers at the respective sites may be arranged in any appropriate manner. It is also possible to provide for redundant routers and links in the backbone network.

Packet data gateway support nodes GW1,GW2,GW3 are provided for connection to external packet data networks such as Internet, intranets and corporate LANs. The connection to an external network can be done through one or more GW:s. If there are more than one gateway to an external network a selection of gateways is needed at each connection activation. The home location register HLR and domain name server DNS are connected to connectivity backbone via router R4, but they can of course be connected in any other appropriate manner.

The radio network control means RNC 11, . . . ,16 are responsible for selecting a functional server node when a subscriber connects/attaches to the network. Thus, when user equipment $UE_A$ initiates an attach or connect procedure to be attached to the network via a base station of RAN2, RNC 12, which controls RAN2, is responsible for selecting a functional server node FSN. In principle RNC 12 may select any of the FSNs of pool 100 to control the subscriber of user equipment $UE_A$. It is here supposed that RNC 12 selects FSN 3. Advantageously the selection of FSN is done taking load sharing, FSN status etc into consideration. The selection can be performed in different ways, for example a Weighted Round-Robin WRR selection method with reject possibility may be used. This generally means that for each connection or attachment, another or the subsequent FSN is selected, i.e. for the next connecting subscriber, RNC 12 would select for example FSN 4. A weighting factor in a WRR selection method may be a factor which takes the capacity (configured capacity) of each FSN server into account. The actual load on the FSN can also be included in the weighing factor as other factors as well. An FSN server may be provided with the possibility of rejecting a request by an RNC and then the RNC will try another FSN server node. In an advantageous implementation the selection method also includes the possibility to return information in a reject message, e.g. the cause for the rejection, the current load status of the concerned functional server node etc. Advantageously each RNC keeps information about the status of the different FSN servers and inputs this to the selection algorithm.

An RNC may keep information about which FSN server a user equipment station previously has used. This information can then be used when a detached user reattaches and the FSN be reused, which however not always is advantageous, and through the present inventive concept it is suggested how to transfer/redistribute mobile terminal stating after such events (among others). The information may only be stored in an RNC for a given time period, otherwise the storing capacity would have to be unnecessarily high and too old information is generally not useful.

In one embodiment statistics relating to the number of rejects or reasons for rejections etc. by different FSN's is kept in the RNC:s. It is also possible to keep such information in an FSN or in both RNC and FSN. The information can be used to indicate which is the capacity and to trigger a capacity increase. Which FSN is allocated or selected for a particular subscriber or user station, is independent of where in the network the subscriber is. A change of FSN may however be needed if the subscriber or user station moves to other routing areas or radio networks, if the FSN needs to be taken down, is broken, if new sparsely loaded FSNs are introduced or if an MS is routed to the wrong FSN etc. as discussed above. The by FSN temporarily assigned user station (UE) identity (P-TMSI) is stored in the user station at detach and power off. Different ways to code FSN into user station identity can be used, e.g. by some bits identifying FSN etc.

According to the pooling/conglomeration concept, since all FSN servers have substantially the same or identical configuration, the operation and maintenance costs are much lower than in other systems and it also makes it easier to add more capacity e.g. through adding a new FSN. The parameter and software configurations of the FSN:s are advantageously more or less identical. The hardware configuration may of course be different, capacity may differ etc.

If there are more than one pool serving the network, then all FSN:s within a pool particularly have identical parameter and SW configuration. Since there are always alternative FSN:s that can be used if a complete node fails, redundancy on network level is obtained and the redundancy requirements on the FSN are less stringent than the requirements on server nodes/packet data support nodes in other systems. This is further emphasized through the redistribution/transferring capability concept according to the present invention. When the packet data support nodes are divided into two functional nodes, the functional server nodes generally handle the control plane functionalities whereas the user gateway nodes handle the user plane functionalities. This is further described with reference to FIG. 2 below which is a figure similar to that of FIG. 1 but specifically showing an UMTS-implementation.

In an advantageous embodiment, when an RNC has selected a functional server node FSN for a user station or a subscriber attaching to the network, the allocated or selected FSN is responsible for selection of a user gateway node. Particularly each FSN server within a pool can communicate with any user gateway node UGN in the network (or the part controlled by the pool), and each user gateway node UGN can be used by any functional server node FSN in the network of the pool. The FSN may "select" the UGN connected to the RNC it communicates with; i.e. by which it was selected. (Then there is a 1:M relationship between user gateway node UGN and radio network control means RNC.)

Alternatively an FSN may select UGN in a more free manner. In one implementation an algorithm is used according to which the nearest UGN is tried first. Then there is a M:N relationship between UGN and RNC. This is advantageous in so far that it also provides for UGN redundancy. The UGN closest to the concerned RNC may e.g. be selected first to minimize backbone capacity usage and if this UGN is not available or if it rejects the request, another UGN is selected. In case of a reject, a weighted Round-Robin algorithm may be used to select an alternative UGN. If UGN is selected without restrictions, at least to some extent, or if more than one UGN is selectable, this provides for redundancy on a network level as far as functional user gateway nodes are concerned and there will always be an alternative UGN that can be used if a complete UGN fails. The redundancy requirements on such nodes will also be less stringent. It is also advantageous in that upgrading operations are facilitated e.g. when one UGN node is taken out of traffic. It may be an option to use the same UGN until deactivation or detachment.

The selected functional server node may be responsible for selecting between several gateway nodes to external packet data networks such as for example Internet or an intranet for multi-homed APNs (Access Point Name). The nearest gateway node may be selected first or alternatively some algorithm may be used e.g. the weighted Round-Robin algorithm. In one particular implementation load and/or capacity considerations are included in the algorithm. Thus it can be provided for redundancy on network level also as far as gateway node to external network is concerned. There will always be alternative nodes to use if a complete gateway node fails and redundancy requirements will be less stringent on such nodes than in other systems. It is also easy to upgrade such nodes e.g. by taking nodes out of traffic etc.

Figure 2:
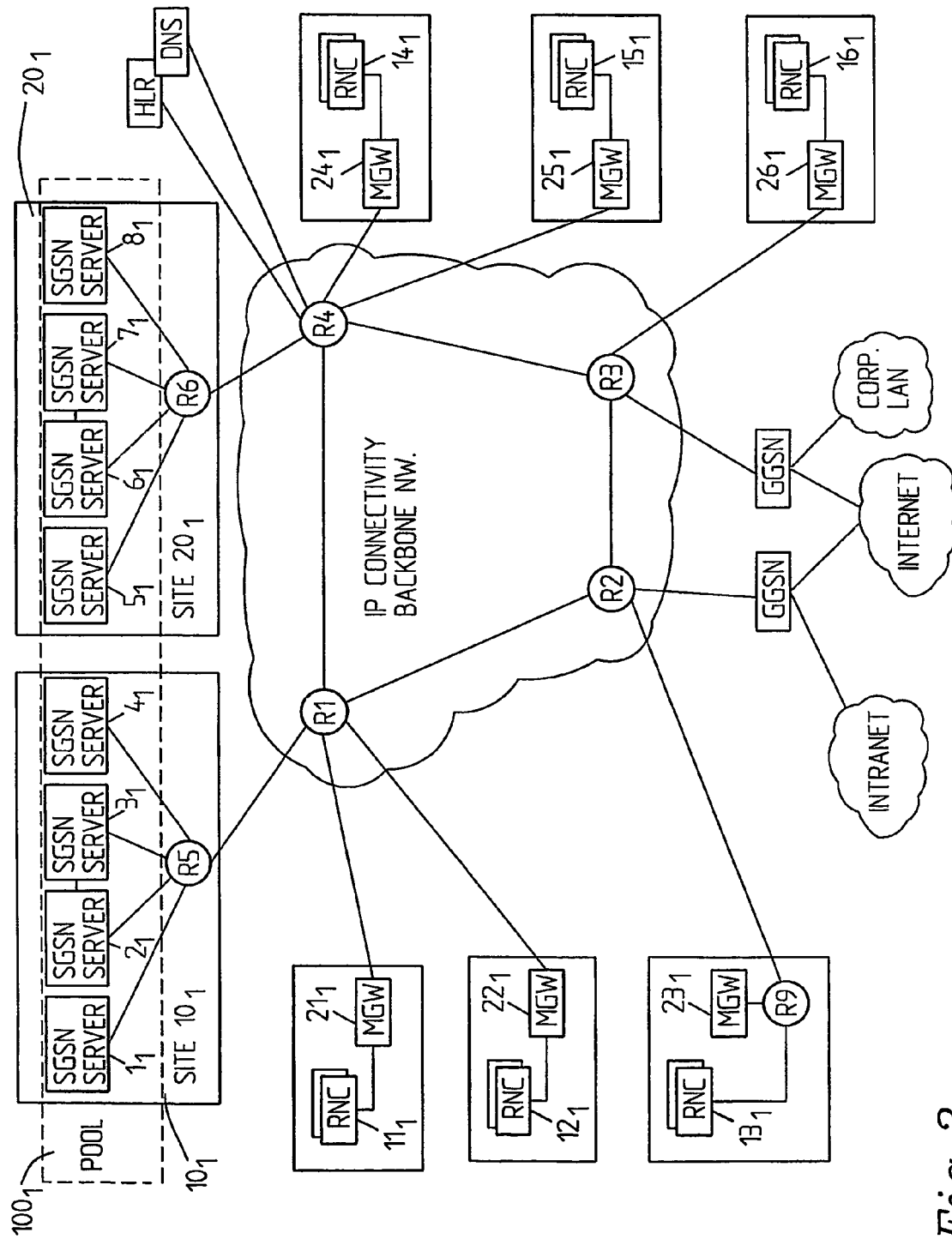
FIG. 2 is a figure similar to FIG. 1 wherein a communications system comprising GPRS/UMTS comprises a number of functional server nodes in the form of SGSN server nodes (and user gateway nodes comprising media gateways)

FIG. 2 shows an UTMS system in which the inventive concept can be implemented. Packet data support nodes here comprise SGSNs (Serving GPRS Support Node) and they are divided or decomposed into an SGSN server node and a media gateway (MGW). In other aspects this figure is similar to FIG. 1 and SGSN server nodes $1_1, \ldots, 8_1$ are located at two different sites $10_1, 20_1$ and all form part of a common pool 100. However, in this figure media gateway $23_1$ is connected to router R9 which is in connection with RNC $13_1$ of the radio network and with router R2 of the IP backbone network. In this way redundant MGWs are implemented. A corresponding router can be connected to the other MGWs as well (cf. FIG. 3). The concept of providing redundant user gateway nodes was more thoroughly described above but here the specifical implementation of an UGN in the form of a media gateway MGW is shown. For concepts, terminology etc. that is used it is referred to 3GTS 23.060 v3.4.0 (2000-07), Technical Specification by 3$^{rd}$ Generation Partnership Project (3GPP™) which herewith is incorporated herein by reference.

In the following the decomposition or splitting up of an SGSN node into an SGSN server and a media gateway MGW will be more thoroughly explained. An SGSN normally handles a large part of user and control plane functions. When split up, the SGSN server node will handle all the signalling interfaces (Gs,Gr,Gd etc.) as well as the GTP-C protocol whereas the MGW will handle the user traffic, and in particular the GTP-U protocol. Thus the load, in the state of the art, supported by the SGSN, will be distributed over two different network elements, SGSN server node and MGW. A new interface is introduced between SGSN server node and MGW, however, this will require some additional processing and signalling but this will be quite insignificant and almost entirely offset by the general advantages provided for through the split-up. Particularly the functions of the SGSN server node are session management, mobility management, GTP-C termination, MAP termination, RANAP termination, CDR handling, media gateway selection, GGSN-selection, provision of intercept related information. The protocols referred to above, GTP-C, GTP Control Plane, GTP meaning GPRS Tunneling Protocol, MAP, RANAP (Radio Access Network Application Protocol) are discussed in 3GPP, 3G TS 23.060 v3.4.0 (2000-07).

The media gateway node includes the functionalities of GTP-U (GTP User Plane) termination, collection of usage information for charging and network surveillance purposes, reporting of usage information on demand or event to the SGSN server node or other nodes, provision of content of communication etc.

The SGSN server node may control the MGW through the Mc interface following the ITU-T H.248/IETF MEGACO Standard and GGSN through the Gn interface by means of GTP-C messages. GTP-U packets are transferred between the MGW and the GGSN over the Gn interface and between the MGW and RNC over the Iu interface following the GTP-U specification, cf. the 3GPP document referred to above. Through splitting up an SGSN into an SGSN server node and an MGW, there will only be a functional impact on the SGSN itself and RNCs, GGSNs and other SGSNs as well as the protocols that are used between these nodes are not affected by the decomposition. Besides the Mc interface between the SGSN server and MGW, no other interfaces are impacted. The SGSN server node is a main control node for UMTS (and GPRS). It handles all the signalling interfaces of a 3GPP release 1999 SGSN including the GTP-C protocol on the Gn and Gp interfaces and the RANAP protocol on the Iu interface. The SGSN server controls the media gateway through the Mc interface following the H.248 Standard. The SGSN server supports the Iu interface for UMTS and, in one implementation, the Gb interface for GPRS for GSM.

The MGW handles the user plane functionality for GPRS and terminates the GTP-U tunnels towards the GGSN over the $G_N$ and $G_P$ interfaces and towards the RNC over the Iu interface. The MGW is controlled by the SGSN server through the Mc interface following the H.248 standard. For UMTS the MGW is controlled by the SGSN server through the Mc interface supporting the H.248 protocol with the GRPS specific extensions, the Iu interface between the RNC and the SGSN server supports the RANAP protocol. Mc and RANAP belong to the control plane as well as the Iu interface between the RNC and MGW which supports the GTP-U protocol. In UMTS the Gn interface between the SGSN server node and the GGSN supports the GTP-C protocol and belongs to the control plane. As referred to earlier, the protocols and the terminology can be found in 3GPP, 3G TS 23.060 which was incorporated herein by reference.

FSN:s (SGSN servers) may also be provided in one or more pools, but in which there are no UGN:s, i.e. no nodes or means handling user plane functionalities which might not be necessary for packet switched data. For circuit switched traffic, such nodes are however generally needed, RNC:s then communicate directly with FSN:s.

Figure 3:
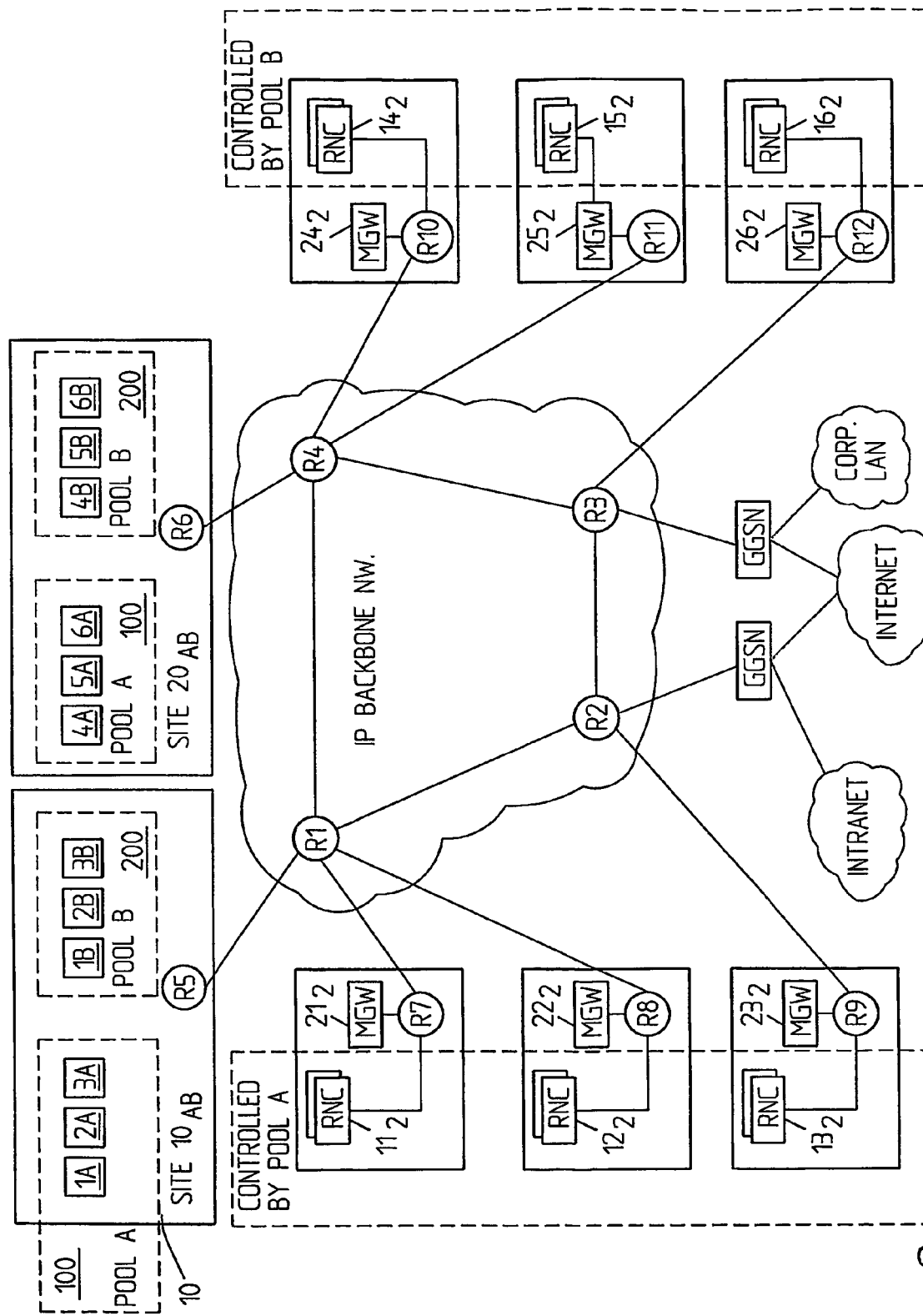
FIG. 3 illustrates an alternative implementation with two pools with functional server means.

FIG. 3 shows another implementation of a system in which the inventive concept can be applied. It is here discussed with reference to UMTS, but it should be clear that it is generally applicable to any system and particularly any system wherein the protocol between the radio network and the packet data support node can be divided between control plan functionalities and user plan functionalities.

SGSN server nodes are provided in two different pools, pool A 100 and pool B 200 respectively. The functional server nodes, particularly SGSN server nodes 1A,2A,3A of pool A 100 are located at site $10_{AB}$ whereas functional server nodes 4A,5A,6A of pool A 100 are located at site $20_{AB}$. Correspondingly functional server nodes 1B,2B,3B of pool B 200 are located at site $10_{AB}$ whereas functional server nodes 4B,5B, 6B of pool B 200 are located at site $20_{AB}$. Functional server means of one and the same pool are located at different sites for reasons of redundancy in case a site is destroyed, or is taken out of operation for some other reason, RNCs $11_2,12_2,13_2$ are here controlled by pool A whereas RNCs $14_2,15_2,16_2$ are controlled by pool B. Here all media gateways $21_2,22_2,23_2,24_2,25_2,26_2$ are connected to routers R7,R8,R9,R10,R11, R12 respectively enabling the use of redundant media gateways as also discussed with reference to FIG. 2. It should be noted that MGW $25_2$ is connected both to RNC $15_2$ and to R11, which is an alternative that also could be represented elsewhere, of course R11 might be connected as e.g R10. In other aspects the figure is similar to those of FIG. 1, FIG. 2.

It is possible to, instead of one pool at two sites (here FIG. 1, FIG. 2), or two pools sharing two sites, have one pool at one site only; however then redundancy is not as good, or two pools at only one site, three pools sharing two sites or three sites or any other convenient constellation. Particularly two or more sites may be co-located but still separate. Alternatively two sites have entirely different locations.

The number of FSN:s (SGSN servers) can be changed arbitrarily without affecting the network structure. Particularly, if the number of subscribers increases, simply more FSN:s (SGSN servers) are added—there is still no need to add UGN:s (MGW:s), RNC:s, BS:s etc.

FIG. 4A shows a network implementation to which the inventive concept can be implemented, a shared RAN with (here) two different operators, Operator 1, Operator 2 with each a Core Network, CN1, CN2. The shared RAN here comprises RNCs $11_3, 12_3, 13_3$ and a number of base stations etc. over which communication is provided with User Equipment UE as described in the foregoing.

As can be seen from FIG. 4A, an operator (here Operator 2) may use a mix of shared and "own" RANs (RANX is here the "own" RAN with RNC $14_3$ of operator 2). An operator may also use only shared RANs, an example hereon is Operator 1.

CN1 here comprises a conglomerate of FSNS, here FSN 1', FSN 2', FSN 3', FSN 4', FSN 5' of which FSN 2'-FSN 5' form part of a pool whereas FSN 1' is not pooled, but still assigned an NRI (Network Resource Id) (in order to make routing in the shared RAN function).

CN2 of Operator 2 also comprises a conglomerate of FSNs, here comprising a first pool, pool 1, comprising FSN 6', FSN 7', and a second pool, pool 2, here comprising FSNs, FSN 8', FSN 9' and FSN 10'. A conglomerate is here taken to mean the FSN nodes of an operator. It may also comprise the FSN nodes of different operators (cf. FIG. 4B). A shared RAN may be operated by a separate company, e.g. a Radio Network Provider. It may of course also be run by Operator 1 or 2 or both.

FIG. 4B is similar to FIG. 4A, but a conglomerate is here taken to mean all FSNs 1'-10' (i.e. FSNs of different operators) connected to an RNC connected to more than one FSN, thus requiring that the FSNs have unique NRIs.

FSN 11' is only connected to RNC $15_3$ and do therefore not need any NRI. (In FIG. 4A all FSNs are required to have a unique NRI.) (An NRI is assigned in an FSN when an MS is given a (P-TMSI if the RNC has more than one option.) All FSNs connected to an RNC in a Shared Network must have a unique NRI (irrespectively of whether in pool or conglomerate, or not).

Figure 5:
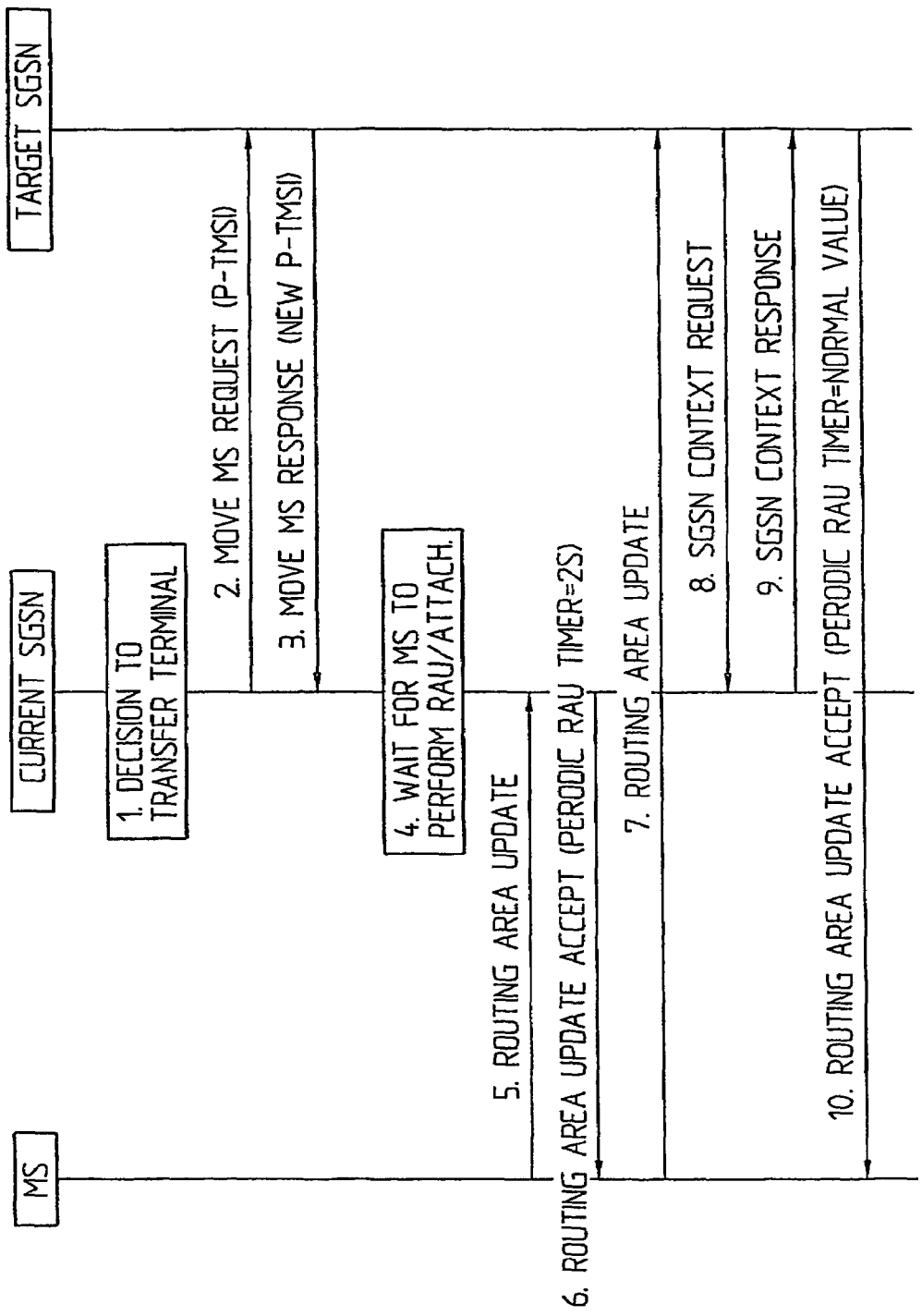
FIG. 5 is a signalling diagram for an implementation for packet switched traffic.

FIG. 5 illustrates the signalling flow (for packet switched communication) when a node, here current SGSN, requests/asks another node, target SGSN, to take over responsibility for a mobile station, MS.

The procedure is as follows:

1. A decision is taken to move MSs from current SGSN to another (target SGSN). The decision may be taken by a person on an O&M level, or automatically by a pool supervisor function eg. monitoring the load in the nodes of the pool. The decision may also be part of a Shared Network (Shared RAN) procedure where an MS tries to attach or roam into an SGSN in a wrong CN (Core Network). Then it needs to be moved to an SGSN in another CN. (Then current SGSN might be a previous SGSN instead, the SGSN from which MS is trying to roam.)

2. The SGSN contacts the target SGSN (selected by the O&M person or pool supervisor function or by some other means) to request a new P-TMSI for the MS. This P-TMSI will contain an NRI that belongs to the new SGSN. This request for a pre-allocated P-TMSI can of course be performed for multiple MSs if more than one MS is to be transferred. The target SGSN may receive information in the request message, e.g. the address to the SGSN which has the context information of the terminal. The address Passed may be the address to current or previous depending on where the contexts are located.

3. The target SGSN generates a P-TMSI for the MS, temporarily stores information from the current SGSN (e.g. IP address, Old RAI etc.) together with the new pre-allocated P-TMSI, and returns a response. This new P-TMSI could be given a time to live in the target SGSN in the case that the redistribution does not occur or fails.

4. The current SGSN waits for the MS/MSs to perform a RAU, either periodic or RA updating or alternatively an attach. In that manner the transfer of the MSs to the target SGSN will be more evenly distributed over time. Further, the transfer may be triggered when the user's activity is low. For the most active users transfer may not occur until late in the evening, but for a planned take down of a node this should not be a problem. In case this procedure is used for Shared UTRAN, the current SGSN will trigger the MS to do the RAU (or a re-attach) immediately.

5. The MS contacts the current SGSN with a Routing Area Update Request message.

6. If the RAU is accepted (e.g. authentication is successful) a Routing Area Update Accept is returned to the MS. In this message the P-TMSI from the target SGSN is sent and the periodic routing area update timer is e.g. set to its minimal value (e.g. 2 seconds).

For UMTS the follow-on flag should be ignored and the Iu connection released (otherwise messages will continue to be routed in RNC to the current SGSN and not to target SGSN as long as the Iu connection is active).

For GSM force to standby could be used. When the MS has accepted the new P-TMSI all signalling for UMTS and all traffic (signalling and data) for GSM will be routed to the new target SGSN. Since this happens, a Routing Area Update Complete message from the MS to the current SGSN will not reach its destination (it might reach the target SGSN which will not understand it and subsequently drop it). However, this is not a problem.

7. In the general case the MS will now (after e.g. 2 seconds) send a new Routing Area Update Request message that will he routed to the target SGSN. The target SGSN will receive the RAU with its specified P-TMSI. Target SGSN will find this P-TMSI and see that it is a pre-allocated P-TMSI. It will then perform an SGSN Routing Area Update (IS-RAU), but using the SGSN address stored with the pre-allocated P-TMSI, instead of using the normal procedure of translating Old RAI to an SGSN address.

For UMTS it is possible that the MS may send a Service Request before a Routing Area Update message (e.g. if the end-user starts using the terminal). The target SGSN will then see that the P-TMSI in the Service Request is pre-allocated in the SGSN and may then use this message to internally trigger an ISRAU. ISRAU is sent to the SGSN the address of which is stored together with the pre-allocated P-TMSI. No RAU Accept shall be sent to the MS if the ISRAU is triggered internally. The periodic routing area update timer in the MS should be reset to a normal value. This can be done using the stand-alone procedure for P-TMSI Reallocation (P-TMSI may or may not be changed).

If a Service Request arrives instead of a RAU, the SGSN may alternatively return a new cause code to the MS, e.g. "unknown in SGSN". This new cause code may then be used to trigger a RAU to be sent to SGSN, which will initiate the ISRAU procedure in SGSN.

8. The target SGSN must use the stored IP address for the old (current or previous) SGSN as destination address for the SGSN Context Request Message instead of the normal procedure of translating the Old RAI into an SGSN IP address. The normal procedure will not work since all SGSNs in the pool/conglomerate (according to one implementation or definition) support the same RAIs.
9. SGSN returns a SGSN Context response.
10. Target SGSN will return a Routing Area Update Accept to the MS. The P-TMSI included here may be the already pre-allocated P-TMSI, but it may alternatively be a new P-TMSI. In the latter case, the pre-allocated P-TMSI should now be released. The periodic routing area update timer is reset to normal value.

The terminology etc. used in FIG. 5 generally refers to packet switched communication.

Figure 6:
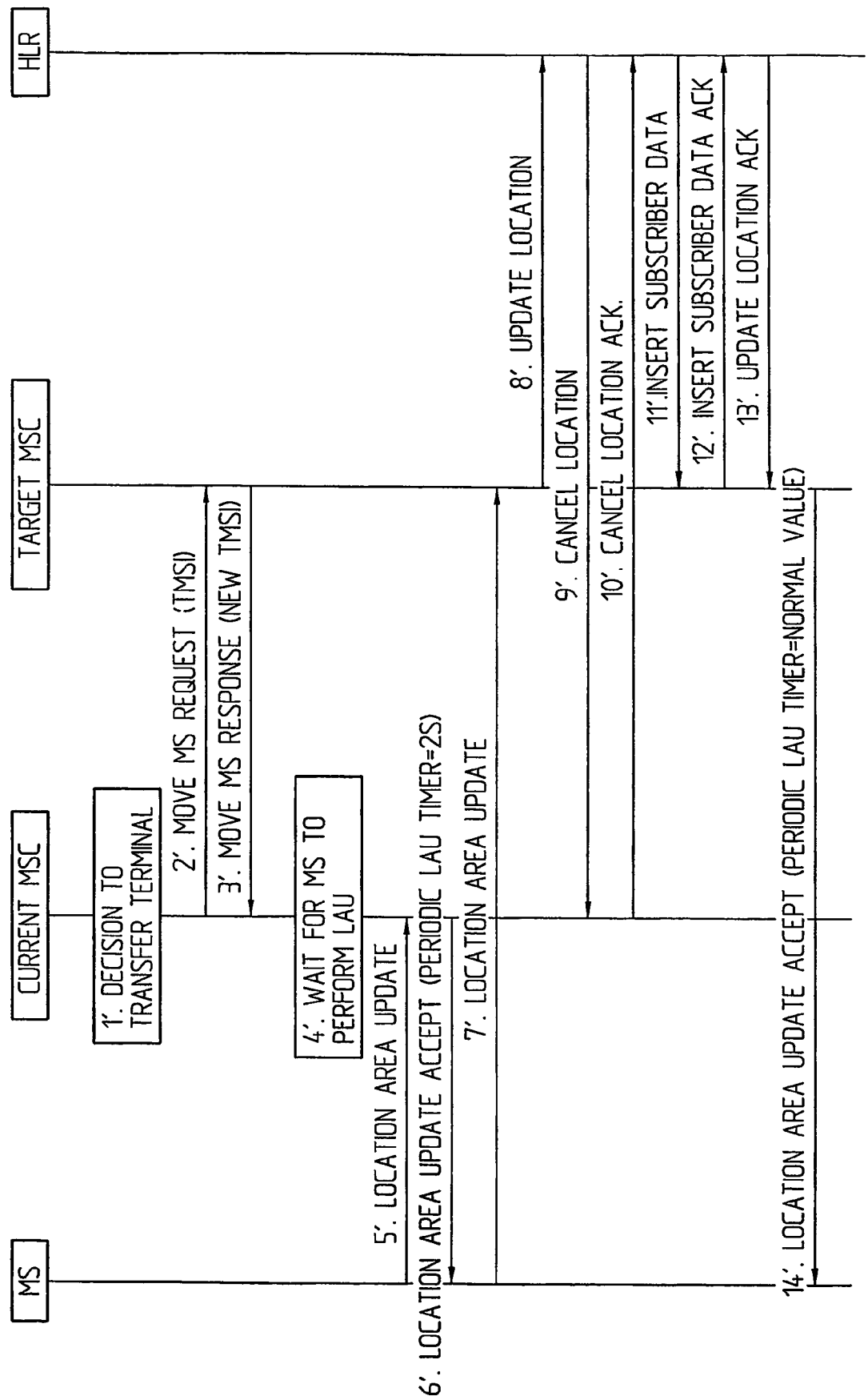
FIG. 6 is a signalling diagram for an implementation with circuit switched traffic.

FIG. 6 is a signalling diagram similar to FIG. 5, but for circuit switched communication.

The different steps are similar from 1'-7', with the difference that it relates to TMSI instead of packet TMSI (P-TMSI), and the terminology is different, here referring to Location Area update etc. However, in this case signalling with HLR (Home Location Register) is required. Thus, when target MSC has received "Location Area Update", 7' from MS, a message 8', Update Location, is sent from target MSC to HLR. Cancel Location message 9' is sent from HLR to current MSC, which sends an acknowledgment to HLR, 10'. HLR then requests target MSC to insert subscriber data, 11', which is acknowledged, 12'. HLR subsequently sends an Update Location Acknowledgement, 13', to target MSC. Target MSC subsequently sends a Location Area update Accept to MS, 14'. In other aspects it is referred to FIG. 5.

Figure 7:
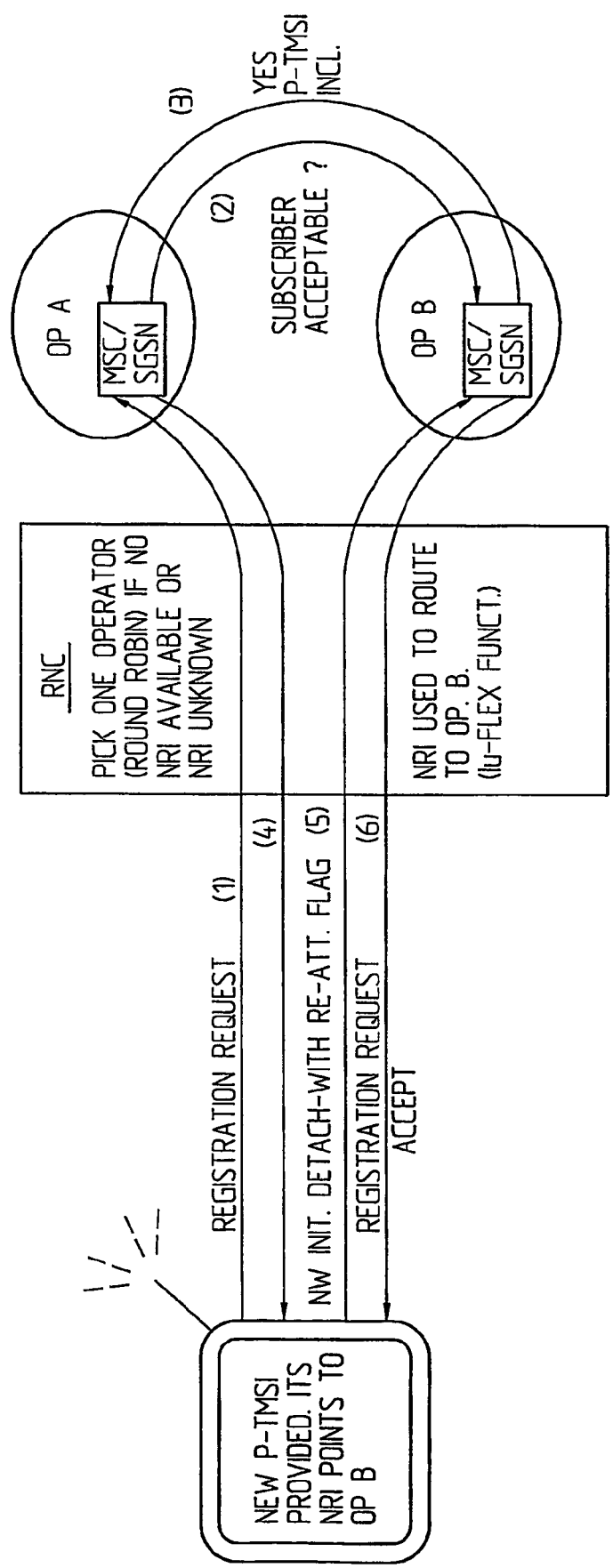
FIG. 7 is a schematical illustration of an implementation in a packet switched, shared network environment.

FIG. 7 shows an embodiment with a shared network (shared RAN) in which a terminal station sends a registration request, 1, to RNC. If no NRI is available, or if NRI is unknown, RNC selects one operator (e.g. using Round-Robin). It should be clear that throughout the application it is referred to NRI, a domain selector or similar could be used (which is signalled from UE (MS), terminal station, to RNC. This is applicable for all embodiments. If Operator A cannot register the subscriber, Operator A sends a message to Operator B asking Operator B if Operator B can accept the subscriber, 2. If Operator B accepts, Operator B sends a response message to Operator B including a P-TMSI, 3 This message may also contain other information or parameters, e.g. the address (ID) to that SGSN that later should be used when fetching context etc. An Attach accept with the new P-TMSI, followed by a Network initiated Detach message, with a re-attach flag, is then sent to the terminal station, 4. The terminal station sends then a new registration request, 5, using the received new P-TMSI, which has an NRI pointing to Operator B, why the request is routed by RNC (using NRI, i.e. conventional Iu-flex functionality) to Operator B. (NRIs are coordinated between Operator A and Operator B). Subsequently Operator B sends an Accept message to the terminal station, 6. This is a solution for the packet switched domain, and the handling can be said to be transparent to the RNC.

It can be said to be a CN centric solution which with coordinated NRIs between the Operators implements normal Iu-flex routing in RNC. CN Operator selection is handled by CN in conjunction with the terminal station and there are a CS specific procedure to reallocate TMSI in MS and thereby move it to a new MSC, and a PS specific procedure to reallocate P-TMSI in MS and thereby move it to a new SGSN. There are two alternative ways for MSC/SGSN to obtain TMSI/P-TMSI to a target MSC/SGSN, namely by having a pre-allocated range of TMSIs/P-TMSIs to each cooperating operator, or by introducing new CN-CN signalling to ask cooperating operator's MSC/SGSN if it can accept the subscriber and exchange parameters. The CN Operator selection procedure can also be used for re-distribution of subscribers in a pool from one CN node to another, e.g. at node maintenance or load unbalance, or for other reasons as discussed above.

For such a solution slightly different procedures are to be implemented for packet switched (PS) traffic and for circuit switched (CS) traffic respectively, as illustrated above.

The steps for a PS procedure may be:
If the Initial NAS (Non Access Stratum) (from MS, transparently through RNC to SGSN) message is an Attach request (WCDMA only):
  Get a new P-TMSI (pre-allocated or through signalling).
  Send an Attach accept (temporary) with the new P-TMSI to UE (terminal station).
  Send immediately after a Network initiated Detach request, with re-attach flag set.
  The UE re-attaches using the new P-TMSI (with another RNI). The RNC routes the message to the right SGSN based on the NRI in the P-TMSI.
If the Initial NAS message is an RA Update:
  Get a new P-TMSI (provide Old RAI to target SGSN).
  Send an RAU accept with the new P-TMSI to UE. Periodic timer=0 (or any other minimum value).
  Terminal station UE initiates a Periodic RAU, which is routed to the new SGSN and there handled as an Inter-SGSN RAU. The Old RAI (above) is used to retrieve the Contexts from the correct SGSN.

In order to minimize inter-operator signalling for a CN node selection procedure, the MSC/SGSN may be self-learning in what IMSI series is handled by what operators (with time-to-live).

The CS specific procedure for reallocating TMSI, and thereby transfer an MS may comprise the steps of:
  Performing an IMSI analysis in MSC/SGSN and decide from pre-configured data which operator shall handle the subscriber. Telling the UE with TMSI reallocation that it shall use a specific NRI. This NRI is used exclusively for transferring UEs from Operator A to Operator B.
  With the next periodic Location Update or service-request routing the UE to Operator B nodes and it gets a new TMSI(NRI) so that the "transfer-NRI" will be free for other UEs to be transferred.

Figure 8:
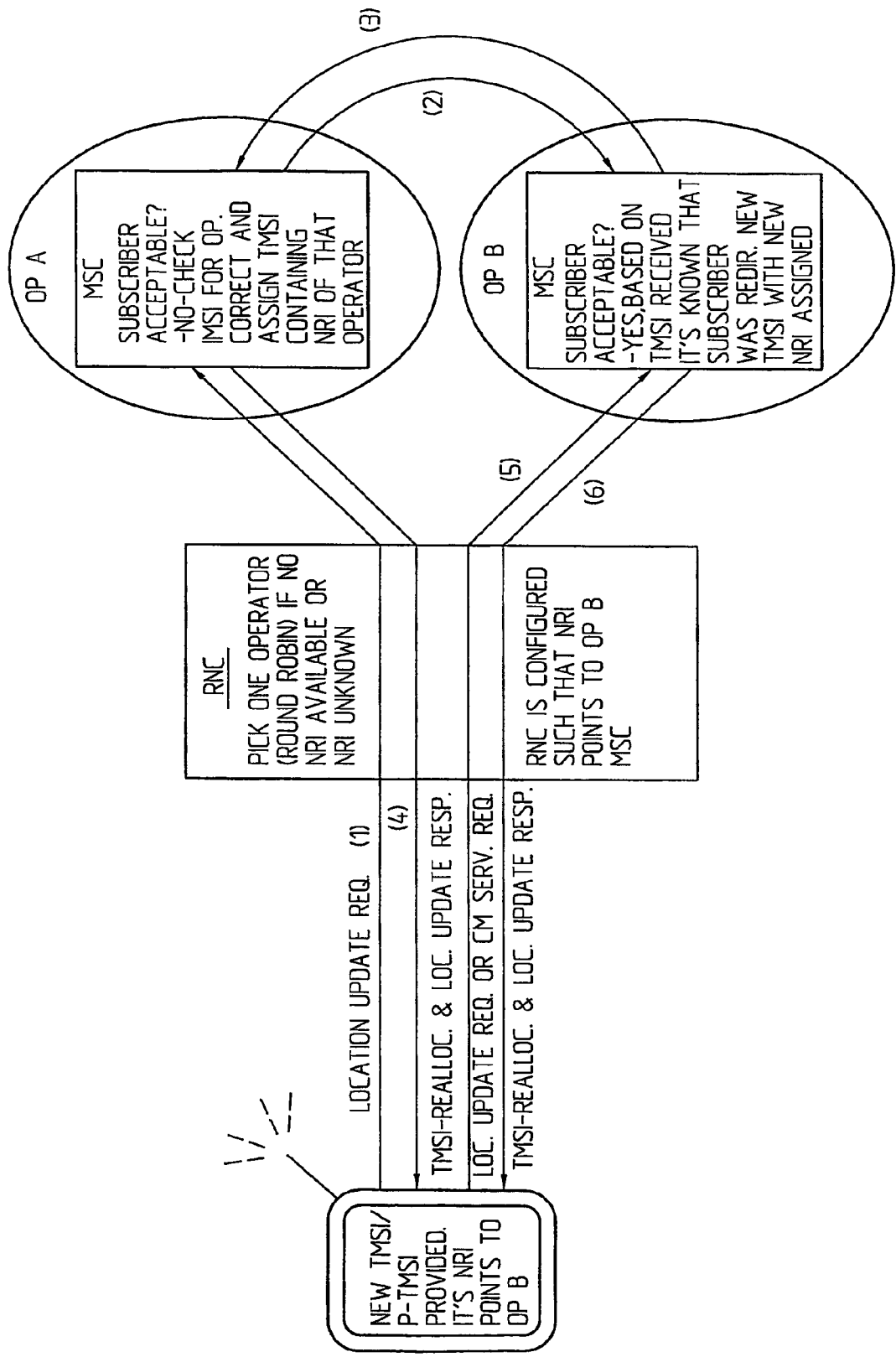
FIG. 8 is a schematical illustration of an implementation in a circuit switched, shared network domain.

FIG. 8 shows an embodiment which is an alternative to that described in FIG. 7, but for the circuit switched domain. In this case a Location Update Request (1) is sent from the terminal station (UE) to the MSC of Operator A. If no NRI (or domain selector or similar) is available, or if it is unknown, one operator may be selected, e.g. by means of Round-Robin (cf. FIG. 7). MSC of Operator A checks if the subscriber is acceptable, if not, IMSI for the correct operator is checked and a TMSI is assigned containing NRI (or domain selector) of that operator. A message with TMSI is sent to Operator B, 2. If the NRI-sharing (if NRIs are implemented) gets too complicated to be coordinated between the operators, a new procedure might be needed, but also then one operator must know the NRIs (here) of the other operator.

Operator B MSC checks if the subscriber is acceptable, and concludes that it is. Then it establishes, based on the TMSI received that the subscriber was redirected. Then a new TMSI with a new NRI is assigned. A response therewith is returned to MSC of Operator A, 3. Operator A MSC sends a TMSI-Reallocation and Location Update Response to the terminal station, 4. In the terminal station a new TMSI/P-TMSI is provided, the NRI of which points to Operator B. The terminal station sends a Location Update Request or CM Service Request to Operator B MSC, 5. (RNC is configured in such a way that the NRI points to the MSC of Operator B (normal Iu-flex functionality). The MSC of Operator B then returns a TMSI-Reallocation and Location Update Response to the terminal station, 6.

Also here the handling is substantially transparent to the RNC.

In another solution (not shown), here being denoted RNC centric, the RNC copies and stores the NAS message in RNC when sending to one MSC/SGSN. (Only when there is no NRI in TMSI/P-TMSI and for visiting terminals.) MSC/SGSN indicates to RNC that the new subscriber is not accepted by taking down the Iu-connection (Iu-release-command), with a new cause code. If Iu is released, the RNC does not forward the NAS reject message, but instead sends the stored NAS message to next MSC/SGSN.

Figure 9:
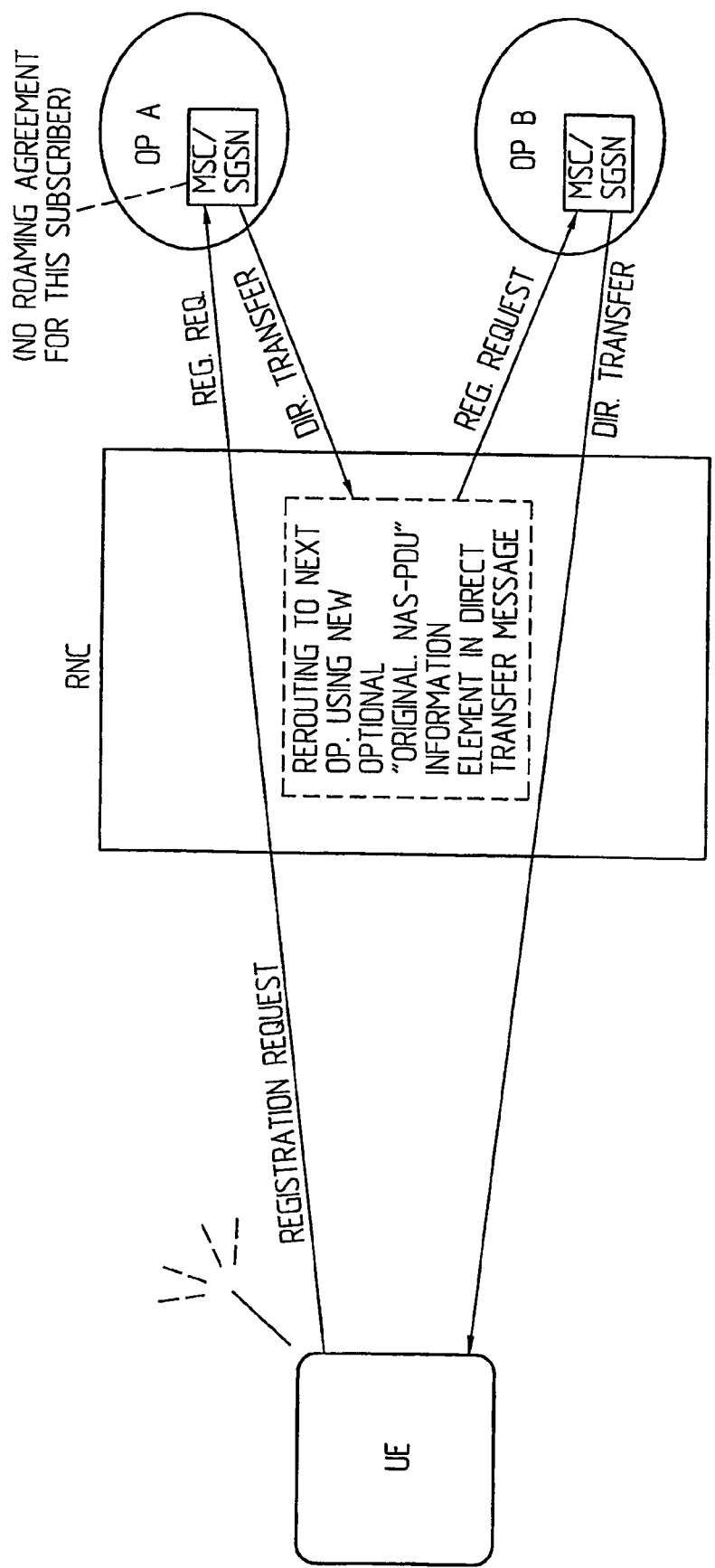
FIG. 9 shows an alternative implementation for re-direction of a mobile station.

FIG. 9 shows another alternative for redistribution. The figure shows how it can be applied in a Shared Network (Shared RAN/Shared UTRAN) environment, but it is also applicable in other redistribution cases described in this document.

In this figure a registration request (e.g. Routing Area Update (RAU), Location Area Update (LAU), Attach Request, etc) is sent as an NAS message from User Equipment (UE) to CN code (SGSN/MSC). In normal situations the UE will be able to indicate in the message to what operator (Op A or Op B) it want to be connected to. This indication can be specified in a Domain Selector (DS) which can be included in the registration message together with the NAS message and the Intra-Domain NAS Node Selector (IDNNS) (see 3GPP standard TS 23.236). The DS value may for example be the MCC/MNC code used to identify a mobile operator. For UEs that don't specify any DS value, the NRI value in the IDNNS or the P-TMSI/TMSI value in the NAS message can be used to select domain, if it contains a valid NRI value, which is the normal case. For all other situations where no valid NRI is present nor any DS value, the figure applies.

When the registration request arrives to RNC and no domain selector information is present, the RNC selects one of the operators according to some algorithm present in the RNC. The algorithm may use a random distribution, a round-robin distribution etc. The algorithm may be weighted according to agreements between the operators sharing the RAN. The weight-factors may be configured in the RNC or in a node external to RNC. The registration request is forwarded to the selected CN node (SGSN/MSC).

The CN node that receives the registration request starts its registration procedure. The outcome of that procedure may be that the UE is accepted in the operator's network, which is signaled back to the UE as a NAS registration accept message. The RANAP Direct Transfer message (see 3GPP TS 25.413, subclause 9.1.34) is used to convey the message from CN node to RNC. Likewise if the outcome of that procedure is that the UE is rejected in the operators network, this is signaled back to the UE as a NAS registration reject message. The RANAP Direct Transfer message is used to convey this message as well.

The problem for the RNC is that it doesn't understand the NAS messages it forwards between the CN node and the UE. In the reject case a solution for redistribution would be that the RNC sends the registration to any next available operator, i.e. to one of the operator's CN nodes, instead of forwarding the reject to the UE. A solution to this have been proposed in 3GPP, where a new message is defined Reroute Command which commands the RNC to reroute the NAS registration message to another operator if possible. The original NAS registration message is attached to the message. However this causes problems, if the RNC has no more operators to forward the registration request to.

Therefore a new solution to this is proposed below. In this solution both the NAS reject message and the original NAS registration message are included. This is done as an extension to the Direct Transfer message or as a new message e.g. Conditional Direct Transfer.

Three new optional IEs are included compared to the original Direct Transfer message (see 3GPP TS 25.413 V5.3.0). A first added IE is Original-NAS-PDU (optional). The CN node shall include a copy of the original NAS registration message, if the registration was rejected AND if the CN node is configured for Shared RAN environment (both conditions shall be fulfilled). If this optional IE is included in the Direct Transfer message, the RNC will know that this is a registration that was rejected and rerouting to other operator should be attempted. If there are no more operators, then the Original-NAS-PDU IE is just ignored and the reject in the NAS-PDU is forwarded according to the normal procedure.

The second IE that is added is Domain-Selector-Status where it, for example, can be explicitly indicated to RNC that a rerouting to other operator should be attempted. It may also be used to indicate to RNC when registration requests have been accepted. No Original-NAS-PDU will be present in that case, but the RNC might need the indication to clean up temporarily stored data, e.g. what operators has been attempted to forward to.

The third added IE is IDNNS. When IDNNS IE is present, the Original-NAS-PDU IE shall also be present. IDNNS IE may be used in Shared RAN environments, but its main purpose is to enable redistribution within a Pool of CN nodes. It shall be passed from the CN node (SGSN/MSC) to the RNC to trigger a redistribution of a registering UE. For example, if the CN node doesn't accept more registration requests (for reasons described in relation to redistribution earlier in this document), the CN node may then reject the registration but also include an IDNNS IE with an NRI pointing to another CN node in the same Pool, together with a copy of the NAS registration message in Original-NAS-PDU IE. The RNC may then attempt to send the original NAS registration message to another CN node in the Pool. Alternatively it may ignore the IDDNS IE and the Original-NAS-PDU IE and just forward the reject to the UE.

The extended Direct Transfer message is shown in the table below.

| IE/GROUPE NAME | PRESENCE |
|---|---|
| Message Type | Mandatory |
| NAS-PDU | Mandatory |
| LAI | Optional |
| RAC | Optional |
| SAI | Optional |
| SAPI | Optional |
| Original-NAS-PDU | Optional * |
| Domain-Selector-Status | Optional * |
| IDNNS | Optional * |

* = Added IEs

It should be clear that the invention is not limited to the explicitly illustrated embodiments, and it is by no means limited to be implemented in a pool concept as disclosed in FIGS. 1-3, but it is applicable by only pool/conglomerate concept, with or without Shared RANS.

It should also be clear that radio network control means, e.g. in the case of GSM, may comprise BSCs. This is applicable throughout the application.

The invention claimed is:

1. A pool of functional server nodes in a packet data network for controlling a number of radio network control nodes to which mobile terminals are connected, wherein each functional server node forms part of a packet data support node when combined with a media gateway, and wherein control responsibility for connections from a given mobile terminal is assigned to a current functional server node selected from the pool of functional server nodes, said pool of functional server nodes comprising:
   an interface enabling each functional server node to control any, or a number of, the radio network control nodes;
   means for initiating by the pool of functional server nodes, a transfer of the control responsibility for the given mobile terminal's connections from the current functional server node to a selected target functional server node in the pool; and
   means for transferring the control responsibility for the given mobile terminal's connections to the selected target functional server node without interrupting service to the given mobile terminal, said means for transferring comprising:
      means for generating and at least temporarily storing in the target functional server node, address information for a node where context information for the given mobile terminal is stored;
      means for sending a response including a pre-allocated TMSI/P-TMSI to the current functional server node;
      means for receiving in the current functional server node, a predetermined relevant action message from the given mobile terminal;
      means for sending a response message from the current functional server node to the mobile terminal with the pre-allocated TMSI/P-TMSI;
      means for sending from the given mobile terminal to the target functional server node, a new relevant action message;
      means for sending an information request from the target functional server node to the current functional server node;
      means for sending an information response from the current functional server node to the target functional server node; and
      means for sending a transfer acceptance from the target functional server node to the mobile terminal.

2. The pool of functional server nodes according to claim 1, wherein the pool of functional server nodes is responsible for controlling all, or a dedicated part of, the radio network control nodes in a plurality of radio access networks.

3. The pool of functional server nodes according to claim 1, wherein the packet data support node is a Serving GPRS Support Node (SGSN) divided into a functional SGSN server node for performing control plane functionalities and a functional user media gateway for performing user plane functionalities.

4. The pool of functional server nodes according to claim 1, wherein the selected target functional server node is selected from any of the functional server nodes in the pool other than the current functional server node.

5. The pool of functional server nodes according to claim 4, wherein the means for initiating the transfer of control responsibility includes control means for determining whether the control responsibility for the given mobile terminal is to be transferred, and if so, for selecting the target functional server node from the pool.

6. The pool of functional server nodes according to claim 5, wherein the means for determining whether the control responsibility for the given mobile terminal is to be transferred makes a determination based on one or more of:
   arrival of a scheduled transfer time;
   the addition of a new functional server node to the pool; and
   detection of a load condition in the current functional server node that exceeds a predefined load threshold.

7. The pool of functional server nodes according to claim 5, wherein the control means is provided in the current functional server node.

8. The pool of functional server nodes according to claim 5, wherein the control means is a pool supervisor that is externally provided in relation to the current functional server node.

9. The pool of functional server nodes according to claim 5, wherein the control means is provided at a network operations and maintenance level separate from the pool.

10. The pool of functional server nodes according to claim 5, wherein the means for initiating the transfer of control responsibility includes means in the current functional server node for sending a request to the target functional server node requesting a new pre-allocation TMSI/P-TMSI for the given mobile terminal to be transferred to the target functional server node.

11. The pool of functional server nodes according to claim 10, further comprising storing means in the target functional server node for temporarily storing information relating to the given mobile terminal, and for associating the information with the pre-allocated TMSI/P-TMSI.

12. The pool of functional server nodes according to claim 10, wherein the pre-allocation TMSI/P-TMSI contains a Network Resource ID (NRI) or a domain selector for the target functional server node.

13. The pool of functional server nodes according to claim 12, wherein the means for initiating the transfer of control responsibility initiates the transfer when the given mobile terminal performs an update procedure selected from a Routing Area Update (RAU), a periodic update, and a Location Area Update (LAU).

14. The pool of functional server nodes according to claim 13, wherein the means for transferring the control responsibility, at a successful authentication of the given mobile terminal, or an accepted RAU or LAU from the given mobile terminal, returns a message to the mobile terminal station containing the pre-allocated TMSI/P-TMSI from the target functional server node.

15. The pool of functional server nodes according to claim 14, wherein the means for transferring the control responsibility sets a periodic routing update timer substantially simultaneously with the transmission of the message to the given mobile terminal, wherein the timer is set to its shortest allowable time period.

16. The pool of functional server nodes according to claim 15, wherein the target functional server node uses the destination address of the current functional server node for context request messages.

17. The pool of functional server nodes according to claim 16, wherein the target functional server node sends a RAU/LAU accept message to the given mobile terminal containing the pre-allocated TMSI/P-TMSI or another allocated P-TMSI, and resets a periodic routing update timer.

18. The pool of functional server nodes according to claim 1, wherein the means for initiating the transfer of control responsibility initiates the transfer when the given mobile terminal is inactive.

19. The pool of functional server nodes according to claim 1, wherein the means for initiating the transfer of the control responsibility and the means for transferring the control responsibility are adapted to initiate and transfer control responsibility for a plurality of mobile terminals simultaneously to one or more target functional server nodes.

20. A method of transferring a given mobile terminal from a current functional server node in a pool of functional server nodes to a target functional server node in the pool, wherein each functional server node is able to control any, or a number of, radio network control nodes, said method comprising the steps of:
    initiating by the pool of functional server nodes, a transfer of control responsibility for the given mobile terminal's connections from the current functional server node to a selected target functional server node in the pool; and
    transferring the control responsibility for the given mobile terminal's connections to the selected target functional server node without interrupting service to the given mobile terminal, wherein the step of transferring the control responsibility includes:
        generating and at least temporarily storing in the target functional server node, address information for a node where context information for the given mobile terminal is stored;
        sending a response including a pre-allocated TMSI/P-TMSI to the current functional server node;
        receiving in the current functional server node, a predetermined relevant action message from the given mobile terminal;
        sending a response message from the current functional server node to the mobile terminal with the pre-allocated TMSI/P-TMSI;
        sending from the given mobile terminal to the target functional server node, a new relevant action message;
        sending an information request from the target functional server node to the current functional server node;
        sending an information response from the current functional server node to the target functional server node; and
        sending a transfer acceptance from the target functional server node to the mobile terminal.

21. A packet data support node in a packet data network for controlling a number of radio network control nodes to which mobile terminals are connected, said packet data support node comprising:
    a pool of functional server nodes, wherein control responsibility for connections from a given mobile terminal is assigned to a current functional server node selected from the pool of functional server nodes, said pool of functional server nodes comprising:
        an interface enabling each functional server node to control any, or a number of, the radio network control nodes;
        means for initiating by the pool of functional server nodes, a transfer of the control responsibility for the given mobile terminal's connections from the current functional server node to a selected target functional server node in the pool; and
        means for transferring the control responsibility for the given mobile terminal's connections to the selected target functional server node without interrupting service to the given mobile terminal, said means for transferring comprising:
            means for generating and at least temporarily storing in the target functional server node, address information for a node where context information for the given mobile terminal is stored;
            means for sending a response including a pre-allocated TMSI/P-TMSI to the current functional server node;
            means for receiving in the current functional server node, a predetermined relevant action message from the given mobile terminal;
            means for sending a response message from the current functional server node to the mobile terminal with the pre-allocated TMSI/P-TMSI;
            means for sending from the given mobile terminal to the target functional server node, a new relevant action message;
            means for sending an information request from the target functional server node to the current functional server node;
            means for sending an information response from the current functional server node to the target functional server node; and
            means for sending a transfer acceptance from the target functional server node to the mobile terminal; and
    a media gateway connected to the pool of functional server nodes.

22. The packet data support node according to claim 21, wherein the packet data support node is a node selected from a group consisting of:
    a Serving GPRS Support Node (SGSN);
    a Mobile Switching Center (MSC); and
    a Combined GPRS Support Node (CGSN) comprising an SGSN and a Gateway GPRS Support Node (GGSN).

* * * * *

UNITED STATES PATENT AND TRADEMARK OFFICE
CERTIFICATE OF CORRECTION

PATENT NO.      : 7,542,447 B2
APPLICATION NO. : 10/546492
DATED           : June 2, 2009
INVENTOR(S)     : Rönneke et al.

Page 1 of 1

It is certified that error appears in the above-identified patent and that said Letters Patent is hereby corrected as shown below:

On the Title Page, in Field (75), under "Inventors", in Column 1, Line 2, delete "Goteborg" and insert -- Torslanda --, therefor.

In Column 9, Line 38, delete "FSNS," and insert -- FSNs, --, therefor.

In Column 15, Line 21, delete "RANS" and insert -- RANs --, therefor.

Signed and Sealed this

Seventeenth Day of November, 2009

David J. Kappos
*Director of the United States Patent and Trademark Office*